July 23, 1963 V. DEVÉ 3,098,502
VALVE AND DASH-POT ASSEMBLY
Filed April 21, 1961 4 Sheets-Sheet 1

INVENTOR
VAGN DEVÉ
BY Fetherstonhaugh & Co.
ATTORNEYS

INVENTOR
VAGN DEVÉ
BY Fetherstonhaugh & Co.
ATTORNEYS

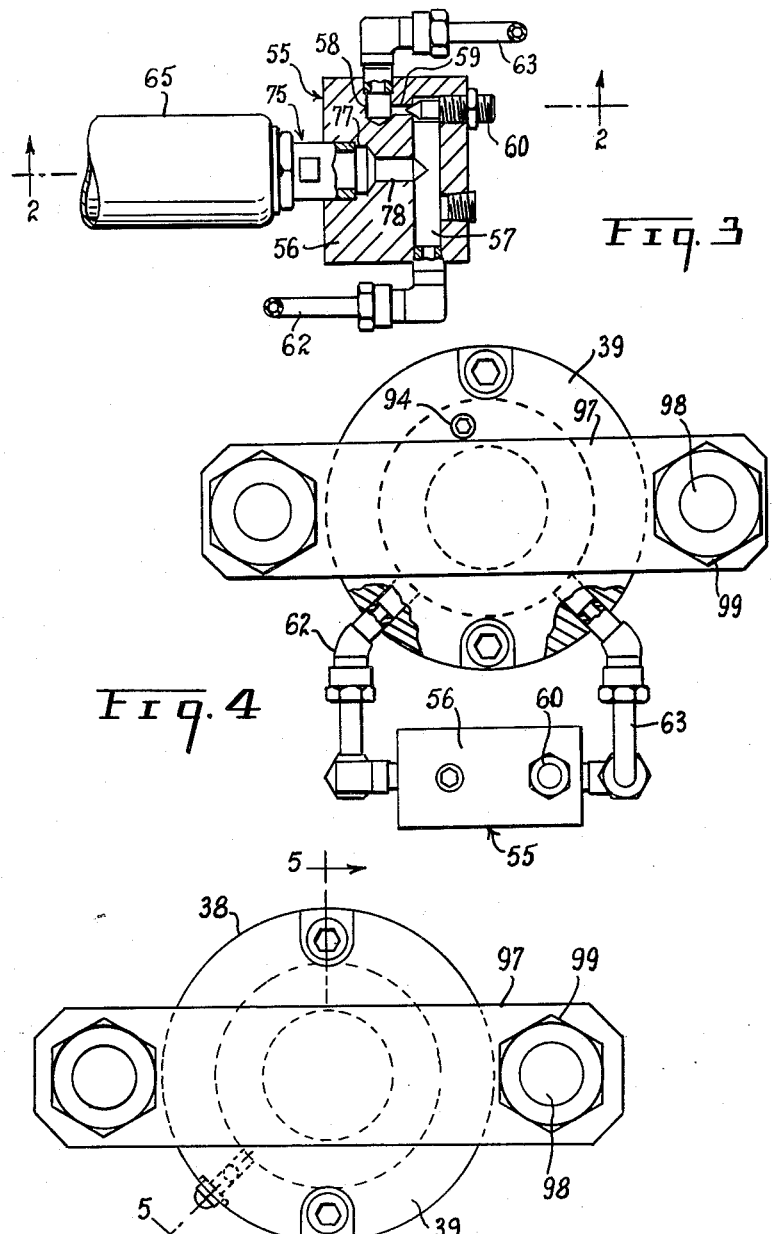

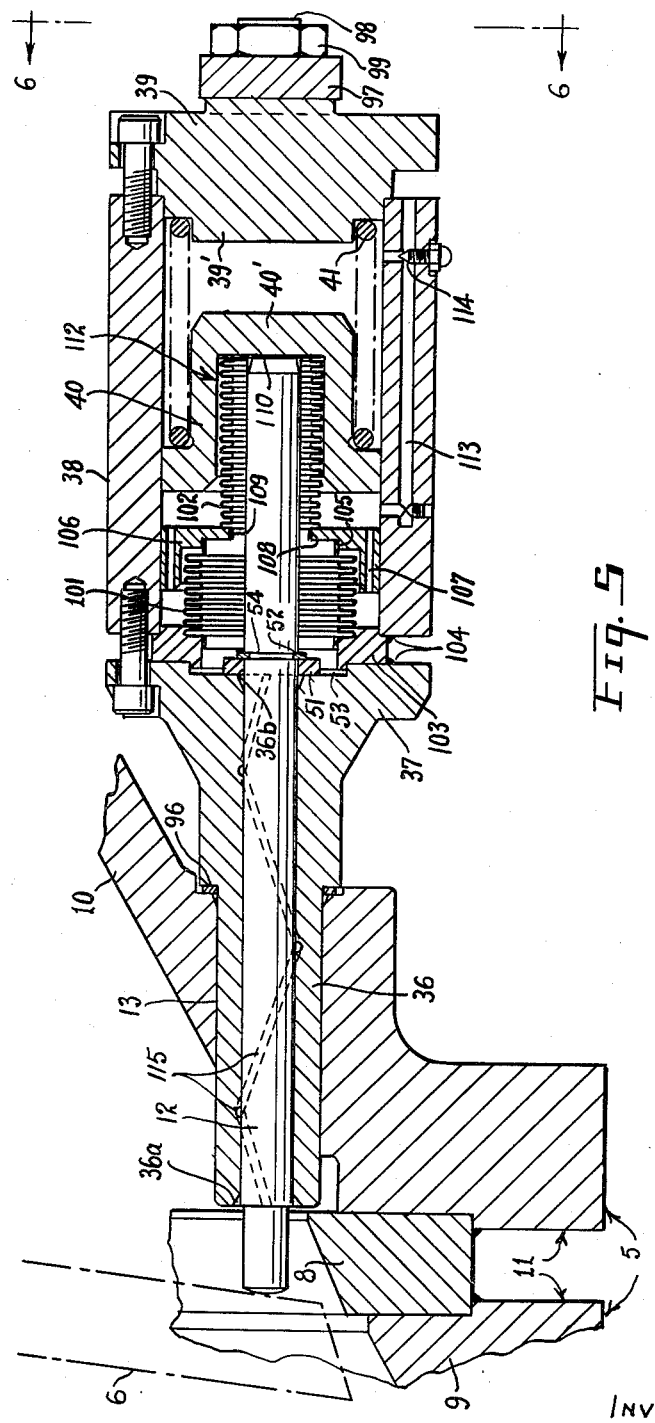

United States Patent Office 3,098,502
Patented July 23, 1963

3,098,502
VALVE AND DASH-POT ASSEMBLY
Vagn Devé, L'Abord a Plouffe, Quebec, Canada, assignor to Dominion Engineering Works Limited, Montreal, Quebec, Canada
Filed Apr. 21, 1961, Ser. No. 104,723
19 Claims. (Cl. 137—514)

This invention relates to a valve and dash-pot assembly including novel means for preventing commingling of the damping fluid in the dash-pot system with the fluid which is routed through the valve casing and is hereafter referred to as the "valved" fluid. The invention also accomplishes other useful results by maintaining the damping fluid in the hydraulic circuit of the dash-pot system under a pressure as close as possible to the pressure of the "valved" fluid.

This application is a continuation-in-part of my co-pending application Serial No. 76,233, filed Dec. 16, 1960.

Dash-pots of the type with which the present invention is concerned usually include an operating member, such as a push rod, arranged to be engaged and moved in one direction by the valve member of the valve assembly as said valve member travels through the last part of its closing movement into engagement with a co-operating valve seat provided in the valve casing of the valve assembly, the movement of the operating member or push rod by the valve member being damped by the resistance of the damping fluid in a hydraulic dash-pot system of which the valve engaging operating member or push rod constitutes a component part. The dash-pot system usually includes a cylinder containing a piston to which the operating member or push rod is attached, said cylinder constituting part of a closed hydraulic circuit which is filled with damping fluid and which includes transfer duct or conduit means interconnecting opposite ends of the cylinder to provide for transfer of fluid from one end of the cylinder to the other, said circuit also including suitable throttling means to give the desired dash-pot or damping effect. The operating member or push rod is normally held in its operative position by a spring or other resilient pressure applying means usually arranged to act against the piston to which the operating member or push rod is attached.

Certain difficulties are met with in the operation of such dash-pots if the "valved" fluid is at a very high temperature or pressure, particularly if intermixing of the "valved" fluid and the damping fluid cannot be tolerated. Even when a ring seal is associated with the operating member or push rod in conventional manner to prevent commingling of the two fluids, the different pressures of the "valved" fluid and the damping fluid cause a pressure differential across the ring seal which may and frequently does result in leaks. Another problem which arises is that the pressure of the "valved" fluid, acting directly on the operating member or push rod, may, under certain peak conditions, reach values high enough to overcome the resilient means usually employed to hold the operating member or push rod in its operative position and, when this happens, the operating member or push rod is rendered incapable of performing its intended purpose of damping the final closing movement of the valve member. If the ring seal is replaced by a bellows arranged in conventional manner to form a sealing barrier, the first difficulty mentioned above is of little importance, but the second difficulty is still present.

It is the object of the present invention to overcome the foregoing disadvantages of conventional dash-pots and, to this end, the invention consists, essentially, in the provision of a movable pressure equalizing barrier having one side exposed to the "valved" fluid and the other side exposed to the damping fluid in said hydraulic circuit, movement of said barrier serving to accommodate fluid displaced by that part of the operating member or push rod which is forced into the cylinder by the valve member as the latter moves to its closed position against the valve seat, said barrier serving, also, to substantially balance the pressure on either side of a seal through which the operating member or push rod passes into the valve casing, said seal being exposed at one side to the "valved" fluid and at the opposite side to the damping fluid in the dash-pot circuit. By virtue of this arrangement, the damping fluid in the hydraulic circuit of the dash-pot system is maintained at all times at a pressure which is the same or as close as possible to the "valved" fluid pressure with the result that there is no appreciable pressure differential across the seal and leakages at the seal cannot occur as long as the seal is in fair condition. Furthermore, the operating member or push rod is kept balanced in its operative position by equalization of the pressures exerted against said operating member or push rod by the "valved" fluid and the damping fluid.

It may be noted at this point that the present invention is not restricted, in its application, to damping the final part of the closing movement of the valve member. It may also be used for damping the final part of the opening movement of the valve member or for damping the final part of the movement of the valve member in both the opening and closing directions.

Proceeding now to a more detailed description of the invention, reference will be had to the accompanying drawings, in which:

FIG. 3 is a fragmentary sectional view of the modified execution shown in FIG. 2, the plane of the section being substantially along the section line 3—3 of FIG. 2.

FIG. 4 is a partial end elevation of the arrangement shown in FIG. 2 as it appears when looking in the direction indicated by the line 4—4 of FIG. 2.

FIG. 5 is a sectional view of a third modified execution of the invention, the section being taken substantially along the section line 5—5 of FIG. 6.

FIG. 6 is a partial end elevation of the execution shown in FIG. 5 as it appears when looking in the direction indicated by the line 6—6 in FIG. 5.

The present drawings illustrate different executions of the invention as applied to a Tilting Disk Check Valve but will be understood that this is merely by way of example since the invention is intended for and is obviously susceptible of use in connection with other types of valves.

Figure 1:
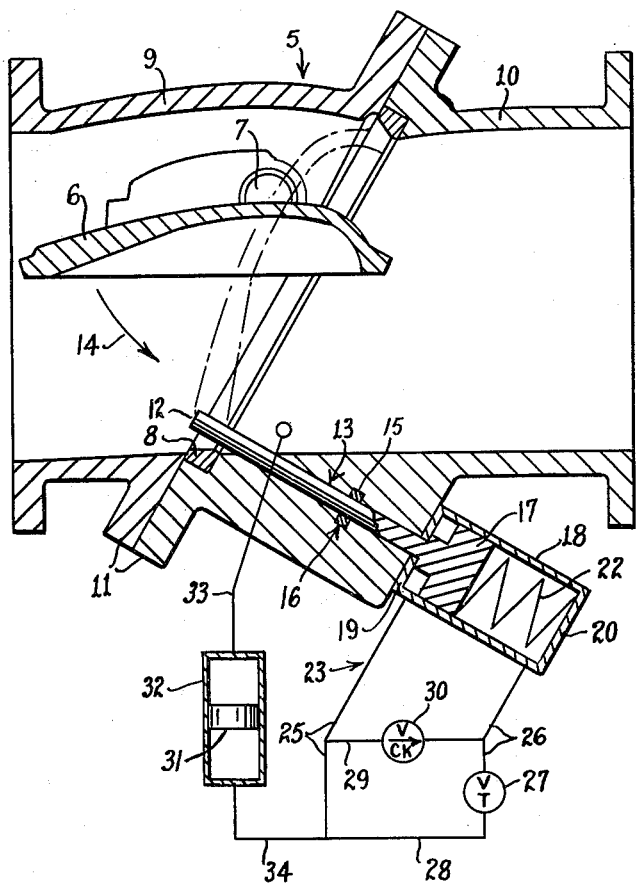
FIG. 1 is a diagrammatic illustration of one execution of the invention as applied to a type of non-return valve commonly known as a Tilting Disk Check Valve.

Description of Execution Shown in FIG. 1

The valve assembly shown in FIGURE 1 comprises a valve housing 5 in which a valve disk 6 is pivotally mounted off centre, as indicated at 7, to close against a valve seat 8. Valve housing 5 may be formed as a single section but is here shown as comprising two housing sections 9 and 10 provided with mating flanges 11 adapted to be bolted or otherwise secured together.

The dash-pot system shown in FIG. 1 includes an operating member in the form of a push rod 12 extending into valve housing 5 through a bore 13 in housing section 10. Push rod 12 is slidable in bore 13 and, in the open position, of valve disk 6, the valve housing end of the push rod is positioned to be engaged and moved by the valve disk as the latter travels through the last part of its closing movement, such movement being indicated by the arrow 14. A sealing ring 15 surrounds push rod 12 in sealing contact therewith and is fitted in a recess 16 provided in bore 12.

The outer end of push rod 12 is attached to a piston 17 slidably mounted in cylinder 18. One end of cylinder 18 is closed by an end wall 19 provided with an opening for the passage of push rod 12 therethrough. The other end of cylinder 18 is closed by an imperforate end wall 20. A spring 22 is confined between piston 17 and the closed end 20 of cylinder 18 and acts against the piston to urge push rod 12 to the operative position shown in FIG. 1.

Cylinder 18 constitutes part of a hydraulic dash-pot circuit which is filled with damping fluid. This circuit also includes a transfer duct, generally indicated at 23, through which fluid is forced from one end of the cylinder to the other by movements of piston 17. For convenient reference, duct 23 is here shown as comprising a conduit 25 having one end connected to the end of cylinder 18 nearest the valve housing, a second conduit 26, equipped with an adjustable throttling valve 27, having one end connected to the end of the cylinder remote from the valve housing, and a third conduit 28 interconnecting the remaining ends of conduits 25 and 26. Conduits 25 and 26 are preferably, but not necessarily, interconnected by a bypass line 29 equipped with a check valve 30 which opens to speed up the transfer of damping fluid from the valve housing end of cylinder 18 to the opposite end of said cylinder when disk valve 6 is reopened and piston 17 is moving, under the influence of spring 22, to return push rod 12 to the operative position shown in FIG. 1.

The salient feature of the invention consists in the provision of means, hereinafter generally referred to as a pressure equalizing barrier, whereby the damping fluid in the hydraulic circuit of the dash-pot system is maintained at all times at a pressure which is the same or as close as possible to the "valved" fluid pressure with the result that there is no pressure differential or at least not sufficient pressure differential across seal 15 to cause leakage at the seal as long as the seal is in fair condition. In FIG. 1 the pressure equalizing means here referred to is shown as comprising a floating piston 31 movable in a casing 32 in sealing contact with the surrounding wall of said casing. One side of piston 31 is exposed to the "valved" fluid through the agency of a conduit 33 connecting one end of casing 32 to the interior of valve housing 5 at a point in the valve housing close to where the push rod 12 projects into the valve housing. The other side of piston 31 is exposed to the damping fluid in the hydraulic circuit of the dash-pot system through the agency of a conduit 34 connecting the other end of casing 31 to the transfer duct 23. The conduit 34 is shown connected to the transfer duct 23 at the juncture of conduits 25 and 28 but it will be understood that, in practice, the end of casing 31 served by conduit 34 may be connected to the hydraulic circuit of the dash-pot system at any suitable point, in lines 25 and 28.

The operation of the arrangement shown in FIGURE 1 may be described as follows:

When valve member 6 moves away from seat 8 to open the flow passage through valve housing 5, spring 22 acts against piston 17 to move push rod 12 to its operative position shown in FIG. 1. Push rod 12 is balanced in this operative position by reason of the fact that the damping fluid in the dash-pot circuit is maintained at approximately the same pressure as the "valved" fluid by the pressure equalizing piston 31. It will also be apparent that since the damping fluid is under the same or practically the same pressure as the "valved" fluid, there is no pressure differential across seal 15 sufficient to cause leakage at the seal.

When valve member 6 is travelling through the last part of the closing movement, indicated by the arrow 14, it engages the valve housing end of push rod 12 and moves the push rod and piston 17 toward the closed end of cylinder 18 against the resistance of the spring 22. During this movement of piston 17, damping fluid is transferred from the right to the left hand end of cylinder 18 partly by flow of the damping fluid through the clearance space between the piston 17 and the surrounding wall of cylinder 18 and partly by flow of damping fluid through the entire length of the transfer duct afforded by the conduits 25, 26 and 28. During this flow of damping fluid from the right to the left hand end of the cylinder 18, the check valve 30 is closed so that the fluid traversing the transfer conduit 23 is prevented from taking the short-cut afforded by the bypass 29, and is forced through throttling valve 27, which controls the speed at which piston 17 will move.

During movement of the push rod 12 toward the closed end of cylinder 20, the displacement of that part of the push rod 12 which is forced into the cylinder 18 by the valve disk 6 is absorbed by movement of the pressure equalizing piston 31 toward that end of casing 32 which is connected to the valve housing 5.

The return of push rod 12 to its operative position by movement of piston 17 under the influence of spring 22 is speeded up by reason of the fact that, during this movement of the piston, the damping fluid, in flowing from the left to the right hand end of cylinder 18, takes the short-cut afforded by bypass 29 and check valve 30.

Figure 2:
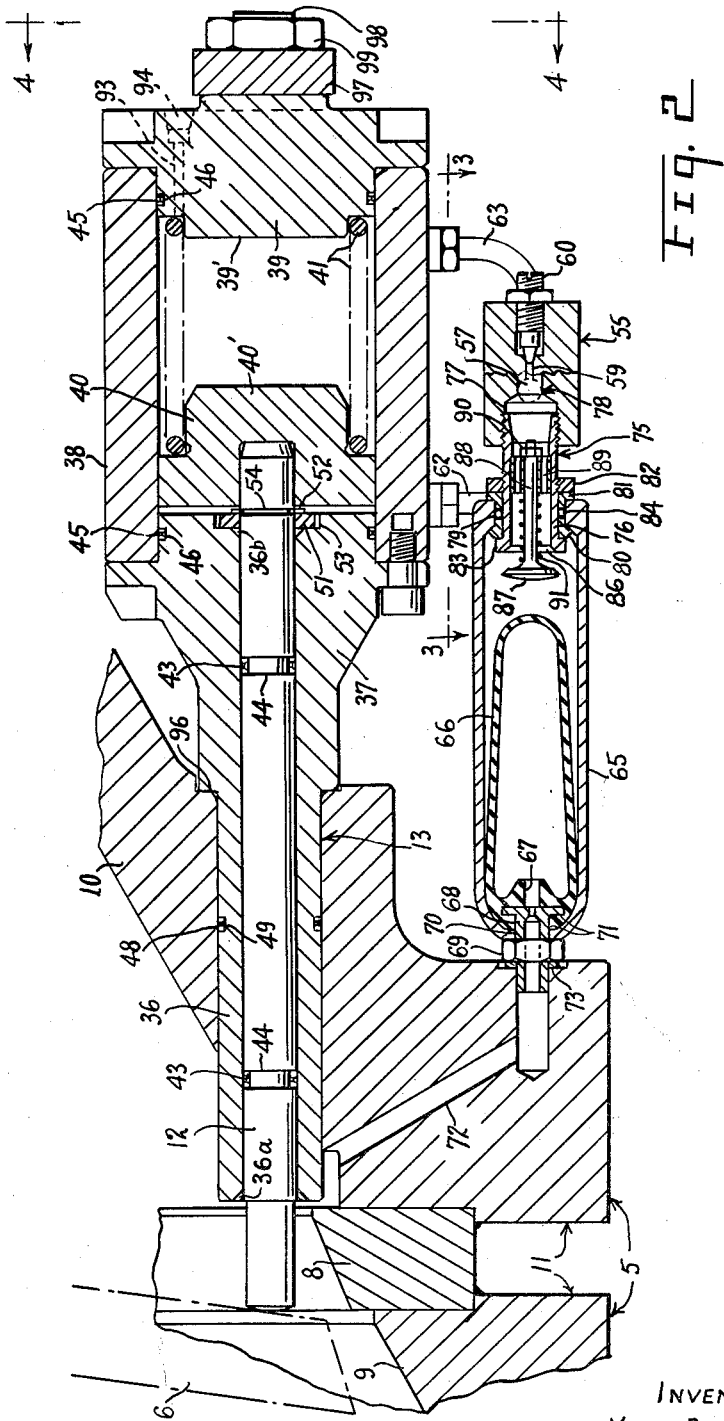
FIG. 2 is a longitudinal sectional view of a second modified execution of the invention, the section being taken substantially along the section line indicated at 2—2 in FIG. 3.

Description of Execution Shown in FIGS. 2 to 4 Inclusive

In this modified execution, push rod 12 slides in sleeve 36 fitted in bore 13 of valve-housing section 10. The outer end of sleeve 36 is integrally joined to cylinder end cover 37 which is bolted to the valve housing end of cylinder 38 which corresponds to the cylinder 18 shown in FIG. 1 and has its opposite end closed by end cover 39 which is also bolted in place.

Push rod 12 extends into cylinder 38 through end cover 37 and is fastened to piston 40 operating in said cylinder. Piston 40 and end cover 39 are formed with projections 40' and 39' which extend into opposite ends of a coil spring 41 which performs the same function as spring 22 shown in FIG. 1.

Sealing rings 43 are fitted in grooves 44 of push rod 12 in sealing contact with the surrounding wall of sleeve 36. Similar sealing rings 45 are fitted in grooves 46 of end covers 37 and 39 in sealing contact with inner surface of cylinder 38. A sealing ring 48 is also fitted in a groove 49 of sleeve 36 in sealing contact with the surrounding wall of bore 13.

Movement of push rod 12 and piston 40 under the influence of spring 41 is limited by a collar 51 and a split ring 52. Collar 51 surrounds push rod 12 and is seated in recess 53 in end cover 37. Ring 52 is fitted in groove 54 in push rod 12. At this point it may be noted that the bore of sleeve 36 is formed with chamfered end portions 36a and 36b to facilitate assembly of the sleeve and push rod 12. The collar 51 overlies the chamfer 36b and ensures an adequate area of contact for stop ring 52.

The hydraulic dash-pot circuit shown in FIGS. 2 to 4 inclusive includes a throttle valve assembly generally indicated at 55. This assembly includes body portion 56 provided with parallel ports 57 and 58 extending inwardly from opposite ends of said body portion and having their inner ends interconnected by a restricted throttling port 59. A needle valve 60 is screwed into body portion 56 in line with throttling port 59 and is adjustable toward or away from the adjacent end of port 59 to give desired throttling effects.

The outer end of port 57 is connected, by suitable piping 62, to the valve housing end of cylinder 38. The outer end of port 58 is connected, by piping 63, to the opposite end of cylinder 38.

The pressure equalizing barrier shown in FIGURES 2 and 3 includes a casing 65 containing a resiliently elastic synthetic rubber bladder 66 which serves the same purpose as the piston 31 of FIGURE 1. Bladder 66 is closed at one end and is provided at the opposite end with an aperture 67 through which "valved" fluid from valve housing 5 is admitted to the interior of the bladder as hereinafter described.

The apertured end of bladder 66 is clamped against the adjacent end of casing 5 by hollow stud 68 and clamping nut 69. Stud 68 extends through end opening 70 of casing 65 and has an inner end flange 71 around which the apertured end of the bladder is molded. Stud 68 is open at both ends to permit flow of the "valved" fluid therethrough and has its outer end portion fitted in one end of a bore 72 formed in section 10 of valve housing 5. The other end of bore 72 opens into valve housing 5 at a point close to where push rod 12 projects into said valve housing. The stud 68 is preferably welded to valve housing 5 as indicated at 73 but may be secured in place in any other desired manner. It will thus be seen that the side of bladder 66 constituted by the inner surface thereof is exposed to the "valved" fluid which is delivered to the interior of said bladder via port 72, stud 68 and bladder aperture 67.

The side of the bladder constituted by the outer surface thereof is exposed to damping fluid which is delivered from the dash-pot circuit into the right hand end of casing 65 through a normally open poppet valve assembly, generally indicated at 75.

The poppet valve assembly 75 includes a hollow tubular valve body 76 open at both ends and having one end secured in the enlarged outer end 77 of a port 78 provided in the body portion 56 of the throttle valve assembly 55, the inner end of said port 78 being in open communication with port 57 of throttle valve body 56.

The body portion 76 of poppet valve 75 extends into the right hand end of casing 65 through opening 79 and is secured to said casing by means of a split retaining ring 80, a spacer 81 and a lock nut 82. The end of the poppet valve body 76 which is positioned in casing 65 is flanged outwardly, as indicated at 83, to provide a shoulder bearing for the retaining ring 80 and a sealing member, preferably in the form of an O-ring 84, is interposed between the split ring 80 and the spacer 81. The end of the poppet valve body 76 disposed within casing 65 is also formed to provide a valve seat 86 adapted, at times, to be engaged by a valve disc 87 carried by a valve stem 88 slidably mounted in a spider bearing 89 and provided, at one end, with a stop nut 90 adapted to limit the opening movement of the valve disc 87 under the influence of a spring 91 interposed between the valve disc and the spider bearing 89 and normally urging the valve disc to open position away from the seat 86.

If desired, the piping shown at 62 and 63 in FIGURES 2, 3 and 4 may be interconnected by a bypass line corresponding to the bypass line as shown at 29 in FIGURE 1.

As previously stated, the bladder 56 shown in FIGURES 2, 3 and 4, performs the same function as the piston 31 in FIG. 1 in regard to maintaining the pressure in the dash-pot circuit as close as possible to the pressure of the "valved" fluid which enters the bladder 66 from the valve housing 5.

In addition to providing fluid communication between casing 65 and the dash-pot circuit, the normally open poppet valve assembly 75 serves to prevent extrusion of the bladder 66 in case of leaks on the dash-pot circuit side of the bladder. When such leaks occur, the bladder pushes against the valve disc 87 and closes the latter against its seat 86.

One advantage of the executions shown in FIGURES 2 and 3 is that it lends itself to the use of a bladder and sealing rings made of synthetic rubber composition.

The hydraulic circuit of the dash-pot assembly shown in FIGURES 2, 3 and 4 may be supplied with damping fluid through a filling bore 93 provided in the end cover 39 of cylinder 38, the outer end of said bore being normally closed by a removable plug 94.

The push rod guide sleeves 36 is shown provided with a shoulder formation 96 which is clamped against valve housing 5 by means of a yoke bar 97, studs 98 and clamping nuts 99. The studs 98 are suitably secured to valve housing 5 and are provided with threaded ends which project through openings formed in the end portion of yoke bar 97 to receive the clamping nuts 99 thereon. The yoke bar 97 extends across and is clamped against the outer surface of end cover 39 of cylinder 38 by means of the clamping nuts 99 which are screwed tightly against the yoke bar.

*Description of Execution Shown in FIGURES 5 and 6*

This execution includes certain parts in common with the execution shown in FIGURES 2 to 4 inclusive and these parts have been identified by the same reference numerals to avoid repetitive description thereof.

The transfer barrier assembly shown in FIG. 5 includes two metal bellows 101 and 102, with different effective areas, encircling push rod 12. The larger diameter bellows 101 is open at both ends and has one end welded to a seal ring 103 clamped in place between cylinder end cover 37 and the adjacent end of cylinder 38, said seal ring being preferably seal-welded to cylinder cover 37 and cylinder 38, as indicated at 104. The other end of bellows 101 is welded to the circumferential wall of a recess 105 provided in guide piston 106 working in cylinder 38, said piston being also provided with through ports 107 for the flow of damping fluid therethrough.

The bottom wall of piston recess 105 partially closes the adjacent open end of bellows 101 and is pierced by a central opening 108 in which the open end 109 of bellows 102 is fitted and welded in place. The other end of bellows 102 is closed by an end wall 110 contacting and capping the cylinder end of push rod 12. Push rod 12 and bellows 102 extend into recess 112 provided in dash-pot piston 40.

The wall of cylinder 38 is bored to provide a fluid transfer port 113 connecting the cylinder space at one side of piston 40 with the cylinder space at the opposite side of said piston. The flow of fluid through port 113 may be throttled by any suitable form of throttling means such, for example, as the needle valve shown at 114.

Bellows 101 and 102 and guide piston 106 conjointly provide a sealed chamber to which "valved" fluid is delivered from the interior of valve housing 5 through a spiral groove 115 formed in the bore-defining wall of sleeve 36.

In the operation of the execution shown in FIGS. 5 and 6, the push rod 12 is moved to the right by the valve member 6 during the final part of the closing movement of said valve member. This movement of the piston rod forces piston 40 to the right and also results in elongation of the bellows 102. At the same time, the fluid displaced from the right hand end of cylinder 8 by movement of piston 40 acts against guide piston 106 to move the latter toward the left hand end of the cylinder and to compress the large diameter bellows 101. In this way, a constant volume of the damping fluid in the hydraulic circuit of the dash-pot system is compressed to approximately the same pressure as the pressure of the "valved" fluid.

In connection with the foregoing, it may be further explained that as long as the large diameter bellows 101 has any freedom to expand, it will be affected only by the pressure of the "valved" fluid, since this pressure is multiplied to a greater extent by the smaller diameter bellows 102. Thus the bellows 101 expands under the pressure of the "valved" fluid up to the point where the pressure in the hydraulic circuit is equal or approximately equal to the pressure of the "valved" fluid. The bellows 102 expands or contracts to compensate for movements of the bellows 101 and push rod 12.

From the foregoing, it will be seen that the structure afforded by the bellows 101 and 102 and piston 106 performs the dual function of (a) providing a seal surrounding the push rod and isolating the "valved" fluid from the damping fluid in the hydraulic circuit, and (b) providing a pressure equalizing barrier for maintaining the damping fluid in the hydraulic circuit of the dash-pot system under a pressure as close as possible to the pressure of the "valved" fluid. This equalization or substantial equalization of the pressures of the two fluids is important in that it serves to maintain the push rod 12 balanced in its operative position.

Having thus described the principal features of my invention and several executions thereof, it will be understood that various modifications may be resorted to within the scope and spirit of the invention as defined by the appended claims.

I claim:

1. A valve and dash-pot assembly comprising a valve housing having a valve seat therein, a valve member movably mounted in said valve housing for movement in one direction to a valve-closing position against said seat or in the opposite direction to a valve-opening position away from said seat, a dash-pot system including a closed hydraulic circuit filled with damping fluid and an operative member positioned to be engaged and moved against the resistance of said damping fluid by said valve member during the final part of the movement of the valve member in at least one of said directions, a path of possible leakage between said valve housing and said dash-pot system, sealing means arranged in said path to prevent commingling of the "valved" fluid and the damping fluid by leakage past said operative member, and means for maintaining the damping fluid in the hydraulic circuit of the dash-pot system under a pressure as close as possible to the pressure of the "valved" fluid.

2. A valve and dash-pot assembly as claimed in claim 1 in which the last mentioned means constitutes part of said sealing means.

3. A valve and dash-pot assembly as claimed in claim 1 in which the last mentioned means is separate from said sealing means.

4. A valve and dash-pot assembly as claimed in claim 1 in which the last mentioned means is constituted by a movable pressure transfer barrier interposed between and separating the two fluids.

5. A valve and dash-pot assembly as claimed in claim 1 in which the last mentioned means is constituted by a movable pressure transfer barrier interposed between and separating the two fluids and in which said barrier constitutes part of said sealing means.

6. A valve and dash-pot assembly as claimed in claim 1 in which the last mentioned means is constituted by a movable pressure transfer barrier interposed between and separating the two fluids, said pressure transfer barrier being separate from said sealing means.

7. A valve and dash-pot assembly as claimed in claim 1 in which the last mentioned means comprises a casing, a floating piston movable in said casing in sealing contact with the surrounding wall of the casing, one end of said casing being in fluid communication with the interior of the valve housing and the other end of said casing being in fluid communication with the hydraulic circuit of the dash-pot system.

8. A valve and dash-pot assembly as claimed in claim 1 in which the last mentioned means comprises as casing, a resiliently elastic bladder arranged in said casing, said bladder having one end closed and the other end open and secured to one end of the casing, one end of said casing being in fluid communication with said valve housing and the other end of said casing being in fluid communication with the hydraulic circuit of the dash-pot system.

9. A valve and dash-pot assembly as claimed in claim 1 including resilient biasing means acting against said operative member to normally hold the latter in its operative position.

10. A valve and dash-pot assembly as claimed in claim 1 in which both the sealing means and the means for maintaining the damping fluid under a pressure as close as possible to the pressure of the "valved" fluid are constituted by a bellows structure.

11. The combination with a valve housing having a valve seat therein and a valve member movably mounted in said valve-housing for movement in one direction to a valve-closing position against said seat or in the opposite direction to a valve-opening position away from said seat, of a dash-pot system comprising a closed hydraulic circuit, including a dash-pot cylinder, filled with damping fluid, said cylinder being provided at one end with an imperforate end cover and at the opposite end with an end cover having an aperture for the passage of a push rod therethrough, a dash-pot piston movable in said cylinder, a push rod extending from the dash-pot piston through the apertured end cover of the cylinder and into said valve housing, resilient biasing means normally maintaining the push rod in an operative position in which the valve-housing end of the push rod is positioned to be engaged and moved against the resistance of said damping fluid by said valve member during the final part of the movement of the valve member in at least one of said directions, sealing means arranged to prevent commingling of the "valved" fluid and the damping fluid by leakage past the push rod, and means for maintaining the damping fluid in the hydraulic circuit of the dash-pot system under a pressure as close as possible to the pressure of the "valved" fluid.

12. The combination claimed in claim 11 in which the last mentioned means constitutes part of said sealing means.

13. The combination claimed in claim 11 in which the last mentioned means is separate from said sealing means.

14. The combination claimed in claim 11 in which the last mentioned means is constituted by a movable pressure transfer barrier interposed between and separating the two fluids.

15. The combination claimed in claim 11 in which the last mentioned means comprises a casing, a floating piston movable in said casing in sealing contact with the surrounding wall of the casing, one end of said casing being in fluid communication with the interior of the valve housing and the other end of said casing being in fluid communication with the hydraulic circuit of the dash-pot system.

16. The combination claimed in claim 11 in which the last mentioned means comprises a casing, a resiliently elastic bladder arranged in said casing, said bladder having on end closed and the other end open and secured to one end of the casing, one end of said casing being in fluid communication with said valve housing and the other end of said casing being in fluid communication with the hydraulic circuit of the dash-pot system.

17. The combination claimed in claim 11 in which both the sealing means and the means for maintaining the dampinng fluid under a pressure as close as posisble to the pressure of the "valved" fluid are constituted by a bellows structure.

18. The combination claimed in claim 11 in which the last mentioned means comprises a casing containing an impervious elastic member dividing the interior of the chamber into two non-communicating compartments, one of said compartments being in fluid communication with the interior of the valve housing and the other of said compartments being in fluid communication with the hydraulic circuit of the dash-pot system.

19. The combination claimed in claim 11 in which the hydraulic circuit of the dash-pot system includes a damping fluid transfer duct located externally of the dash-pot cylinder and interconnecting opposite end of the cylinder, said duct being provided with flow-throttling means for throttling the flow of damping fluid therethrough, said duct also including a check valve controlled bypass affording a short-cut through which fluid may be quickly transferred from one end of the cylinder to the other without traversing the full length of said duct.

References Cited in the file of this patent

UNITED STATES PATENTS

| 2,027,455 | Seibt | Jan. 14, 1936 |
| 2,142,410 | Quick | Jan. 3, 1939 |

FOREIGN PATENTS

| 577,825 | Great Britain | June 3, 1946 |